United States Patent [19]
Pritchard

[11] Patent Number: 5,646,343
[45] Date of Patent: Jul. 8, 1997

[54] SYSTEM AND METHOD FOR MONITORING WIND CHARACTERISTICS

[76] Inventor: Declan Nigel Pritchard, Saudi Aramco Box 8647, Dhahran 31311, Saudi Arabia

[21] Appl. No.: 419,031

[22] Filed: Mar. 10, 1995

Related U.S. Application Data

[63] Continuation-in-part of Ser. No. 269,546, Jul. 1, 1994, abandoned.

[30] Foreign Application Priority Data

| Jul. 2, 1993 | [GB] | United Kingdom | ................. | 9313727 |
| Jan. 17, 1995 | [GB] | United Kingdom | ................. | 9500873 |

[51] Int. Cl.⁶ ............................................. G01B 1/00
[52] U.S. Cl. ............................. 73/170.08; 73/170.28; 364/420
[58] Field of Search ........................ 73/170.28, 170.04, 73/170.05, 170.07, 170.08, 170.09, 170.11; 364/420; 290/55, 44; 340/870.11

[56] References Cited

U.S. PATENT DOCUMENTS

| 4,005,602 | 2/1977 | Wilkie | 73/170.28 |
| 4,152,933 | 5/1979 | Woodhouse | 73/170.28 |
| 4,155,252 | 5/1979 | Morrill | 73/170.08 |
| 4,218,755 | 8/1980 | Root | 364/420 |
| 4,226,115 | 10/1980 | Williams et al. | 73/170.28 X |
| 4,572,962 | 2/1986 | Shepard | 290/55 |
| 5,182,458 | 1/1993 | McConachy | 290/55 |
| 5,221,924 | 6/1993 | Wilson, Jr. | 73/170.11 X |

FOREIGN PATENT DOCUMENTS

| 9218917 | 12/1984 | Japan | 73/170.28 |
| WO92/22882 | 12/1992 | WIPO . | |
| 4019605 | 9/1994 | WIPO | 290/55 |

OTHER PUBLICATIONS

World's Biggest Wind Machine is a One-Armed Monster, David Scott, Popular Science (Jan. 1981).
Teunissen H.W. Structure of Mean Winds and Turbulence in the Planetary Boundary Layer Over Rural Terrain *Boundary-Layer Meteorology* 1980 19:187–221.
Taylor et al. Full Scale Measurements in Wind Turbine Arrays European Community Wind Energy Conference Madrid, Spain Sep. 10–14 1990.

*Primary Examiner*—Elizabeth L. Dougherty
*Attorney, Agent, or Firm*—Woodcock Washburn Kurtz Mackiewicz & Norris

[57] ABSTRACT

A system for investigating the variation of one or more wind characteristics within a volume over a given area comprises a plurality of detectors which output a data signal which is indicative of the value of a wind characteristic, the outputs of all the detectors deployed in the area are relayed to a central receiving unit which may include a recorder for recording the relayed data and may additionally provide a computer and a VDU for providing a real-time display of the data. Preferably each detector comprises a balloon or kite-like device each of which is tethered to one of a plurality of anchor points distributed around the area.

11 Claims, 5 Drawing Sheets

SYSTEM AND METHOD FOR MONITORING WIND CHARACTERISTICS

CROSS-REFERENCE TO RELATED APPLICATION

This application is a continuation-in-part of the earlier U.S. patent application having Ser. No. 08/269,546 which was filed on 1 Jul. 1994 and is now abandoned.

BACKGROUND OF THE INVENTION

1. Field of the Invention

The invention relates to a method and apparatus for monitoring wind characteristic, such as wind speed, wind direction and air pressure within a volume above an area of land.

The invention is primarily aimed at but not limited to providing services for manufacturers, operators and investigators in wind plant, to monitor existing wind farm sites and also to establish the suitability of proposed sites. The invention may allow the modelling of wind flow and equipment turbulence.

Another field in which the present invention may have utility is the detection of micro bursts and critical wind shears at airports.

2. Description of the Related Art

The siting of wind energy conversion plant has a direct impact on its operating efficiency and profitability. However, current practice in the industry for siting, often relies upon intuitive judgement based upon relatively sparse wind speed measurements and extrapolation along topographical features such as hill crests, valleys and the like. Trial and error methods based on actual performance are also used.

More dense ground coverage by conventional anemometers and the like is often considered too expensive and impractical for site evaluation. Current practices at established wind farm sites may limit the locations of anemometers to the wind plant sites only.

A further problem with wind farms is the effect that the wind plant has on the wind field itself. The extraction of wind energy, coupled with the turbulence caused by supporting towers, nacelles etc., changes the actual wind field characteristics relative to that estimated prior to the existence of the plant.

It is an object of the present invention to alleviate some or all of the above-mentioned problems so that siting of wind energy conversion plants can be optimized for any given topography, wind regime and wind energy conversion equipment.

It is another object of the present invention to enable data indicative of the magnitude of wind characteristics within a volume to be collected at frequent and regular intervals with respect to easting, northing, elevation and time.

It is another object of the present invention to permit accurate imaging of what are termed "wind pressure waves". These waves can be imagined when thought of as waves blowing across a wheat field. These waves are important to wind farm operators as they are the manifestation of the wind irregularity that reduces the quality of electrical power sold by wind farms. The form of these "wind waves" has a very strong linkage to the ground topography, wind direction and speed. Consequently, they are very hard to predict and model. The present invention enables measurement of these wind waves directly and therefore allows appropriate siting of plants so as to minimize the effects of machine induced turbulence, thereby improving the overall efficiency of the wind farm.

It is another object of the present invention to optimize the siting of wind plant in both existing wind farms and proposed wind farms.

It is yet another object of the present invention to permit the detection of desirable wind energy "hot spots" and unwanted turbulence zones or areas of low wind speed.

It is still another object of the present invention to provide the means for recording a large body of wind characteristic data, thereby allowing large scale academic and scientific research to be carried out using the recorded data.

It is still another object of the present invention to provide a data acquisition method, digital electronic data recording and storage means, high speed data processing and computer aided visualization means.

It is another object of the present invention to monitor the magnitude of at least one wind characteristic over a large area without requiring a proportionally large number of wind characteristic measuring means.

It is another object of the present invention to provide an array of wind characteristic measuring means in which the measurement provided by each measuring means is not perturbed by the presence of the other wind characteristic measuring means within the array.

It is another object of the present invention to allow for much denser and more regular coverage and much more frequent time sampling than has hitherto been possible.

It is still another object of the present invention to allow the deployment of large numbers of simple and low cost detectors. This deployment can be at any elevation above ground, dependent upon the scope of the survey objectives.

It is another object of the present invention to permit deployment of detectors at regular intervals in orthogonal directions such that $\delta X$ and $\delta Y$ can each be held constant. This will ease the task of any consequent numerical modelling or analysis. As the ground area is adequately covered by a uniform lattice, the gradient, divergence or curl of the characteristic field can be calculated. For example, if the characteristic is pressure, then the gradient is the wind velocity field (i.e. speed and direction) Similarly, if wind speed is being measured, then the gradient of the speed surface may be thought of as the direction.

SUMMARY OF THE INVENTION

The invention herein described may be utilized, in particular, in two preferred modes of operation.

Firstly, the invention may be deployed over an area of land, such that a model can be built to show wind flow over a given area of land for a number of wind speeds and directions. Interpolation and extrapolation can be used to model all eventualities.

Secondly, the invention can be deployed around a specific piece of wind energy conversion equipment. The purpose of this is to determine the exact shape of the effective turbulence zone, emanating from the equipment for all wind speeds. This will provide certifiable data, specific to any piece of equipment.

In preferred embodiments of the present invention, the plurality of wind detectors in the apparatus are arranged into one of a number of preferred configurations. Some embodiments of the invention involve locating the array of wind characteristic measurement means at a first location, gathering wind characteristic data at that location and then subsequently redeploying the array at another location. By redeploying the array in several locations within a particular area, and subsequently collating the data from each of those locations, wind characteristic data throughout the area to be investigated can be obtained.

In a preferred embodiment, data from the area is logged over a period of time on a recording means, and that recorded data may be subsequently analyzed. The recorded data may be down-loaded to another recording means so that it can be down-loaded to a different location for analysis. Alternatively, the recording means itself may be transported to a different location for analysis.

The electrical output of the detectors may be calibrated by the use of more sophisticated and accurate devices placed at strategic locations within the survey area. This calibration may be performed by Fourier analysis and decomposition of the time series signals produced by the simple detectors with respect to the calibration signals. This calibration can take place any time after the signals are recorded. Preferably, the plurality of wind characteristic measuring means are arranged into one or more lines. The height of the detectors in one line may differ from the height of the detectors in another line. For example, if two lines of detectors are deployed with the detectors at two different respective heights and the two lines are arranged to coincide on the ground, then the detectors will be arranged into a wall configuration. This configuration may be particularly useful for investigating the turbulence caused by a particular piece of wind energy conversion equipment.

Alternatively, the two lines of detectors may be spaced parallel to one another, thereby being arranged into a ramp configuration.

In either of the above cases, the presence of one line of detectors does not effect the measurements of the other line of detectors.

Advantageously, the apparatus of the present invention may be deployed as a line, a wall or a ramp. Any of these modes can be utilized such that when there are sufficient data collected at any given position, the whole array can be moved incrementally to cover a different area of ground. In this way, much larger areas can be covered than would otherwise be permitted by a given number of detector devices.

DESCRIPTION OF THE DRAWINGS

In order for the invention to be better understood, specific embodiments of the invention, given by way of example only, will now be described with reference to and as illustrated in the accompanying drawings in which.

A DESCRIPTION OF PREFERRED
EMBODIMENTS OF THE INVENTION

Figure 1:
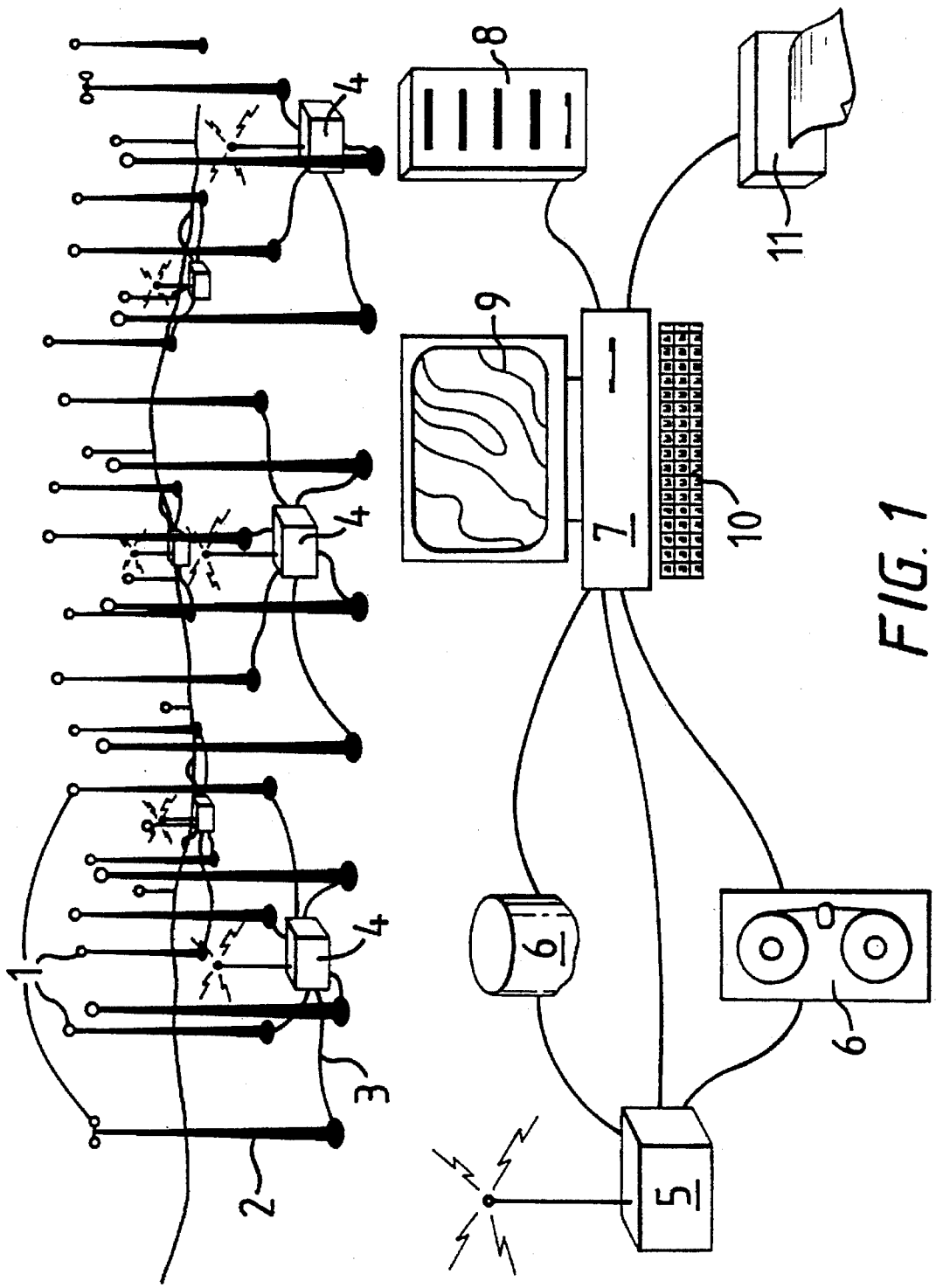
FIG. 1 is a schematic diagram of a first embodiment of the present invention utilizing a first kind of detector device, the apparatus of the invention being deployed over a chosen survey area with detection devices, recording media, data processing and display means.

Referring to the drawings, FIG. 1 shows an array of detectors 1 deployed in a spatially regular manner over an area of land. The detectors are supported and held in a generally vertical position by a support means 2. The height of the detectors 1 above the ground can be adjusted by adjusting the height of the support means 2. The electrical output from the detectors is transmitted via telemetry or wires 3 to a local line control unit 4. The line control units incorporate internal data storage means in addition to process control means and are connected via telemetry or wires to a central recording and control unit (RCU) 5. The RCU 5 has data links to various recording means 6 and an additional computer 7.

Attached to the computer 7 are a further recording means 8, computer screen video display unit 9, keyboard and mouse 10 and paper printing means 11. The line control units 4 and the recording and control unit 5 may have means to multiplex and demultiplex the electrical signals from analog to digital format and from digital format to analog. Similarly, the computer 7 may also have means to multiplex and demultiplex from analog to digital format and vice-versa. In addition, the computer 7 will possess means to record data onto various storage means 8, reproduce data from recording media 8, process data using computer programs and record the results on storage means 8, display the results on video screen 9 or paper printing means 11.

The components numbered 1 through to 6 may be capable of operating in isolation from the components numbered 7 through to 11. This allows the computer to be used either for the processing of previously recorded data or for the real-time monitoring of data which is currently being recorded.

The processing equipment receives data from the detectors 1 and processes this data to enable an operator to identify an optimum position or positions for a wind farm.

Figure 2:
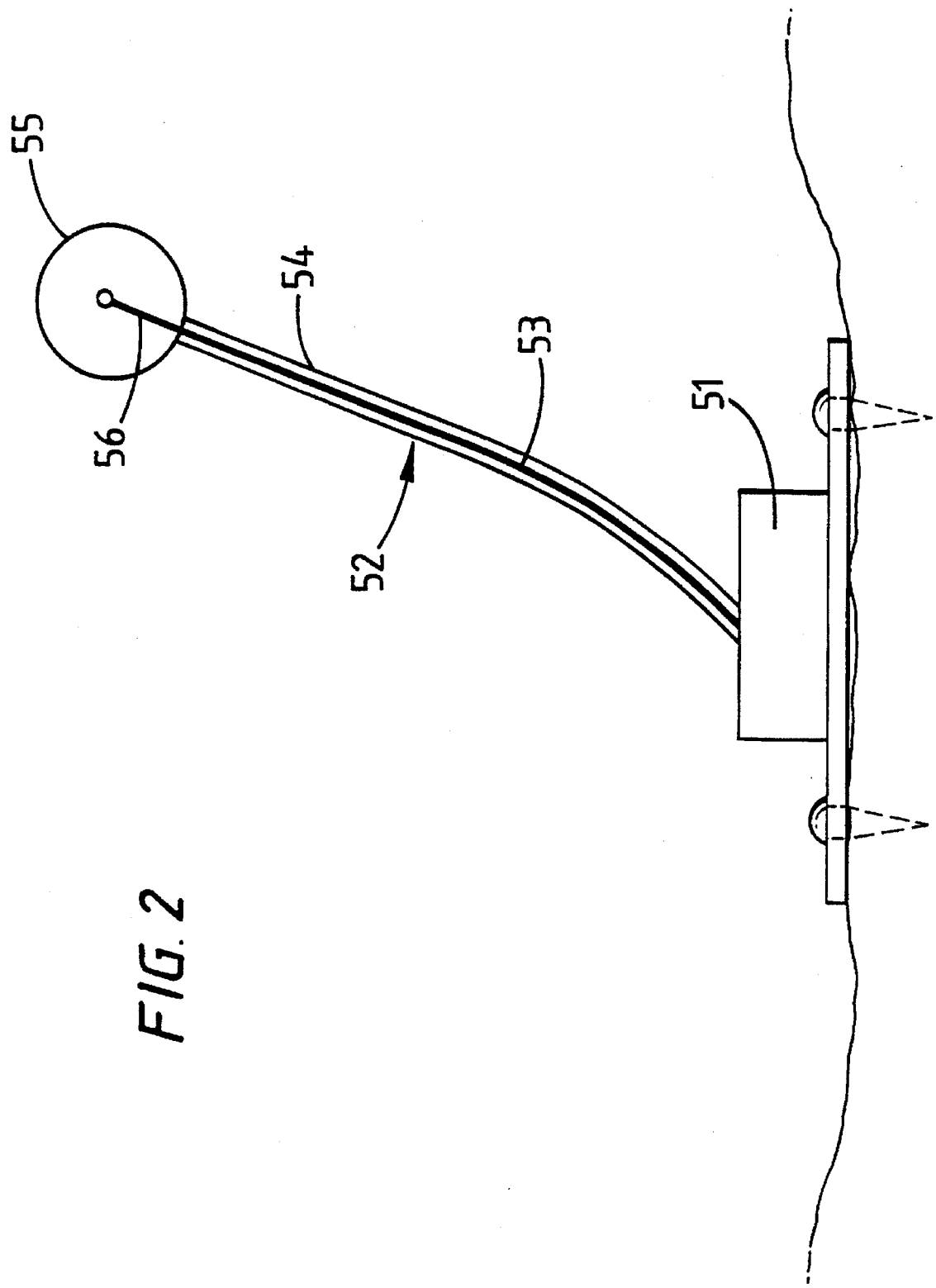
FIG. 2 is a schematic view of a second type of detector device.

An alternative wind characteristic measuring means is shown in FIG. 2. The measuring means comprises an anchor module 51 which is arranged to be secured to the ground. An umbilical tethering device 52 of variable and controllable length rises upwards from the anchor module 51. This tether 52 consists of a shielded electrical conductor 53 encased in a tube 54. A balloon 55 filled with lighter-than-air gas is attached to the uppermost end of the tube 54. The tube 54 is arranged to be capable of transporting the lighter-than-air gas to the balloon 55.

Supported by the balloon 55 is an antenna 56, electrically connected to the conductor 53. The antenna 56 is specifically dimensioned so as to act as the antenna of a rover component of a differential Global Positioning System (GPS). The electronics associated with the rover are housed in the anchor 51.

In use, a number of detectors (FIG. 2) are deployed in an array. One or more base stations 57 are then deployed at known geographical positions close to the array. Both the base stations 57 and the rovers receive radio transmissions from satellites orbiting the earth. This is conventional GPS methodology.

Figure 3:
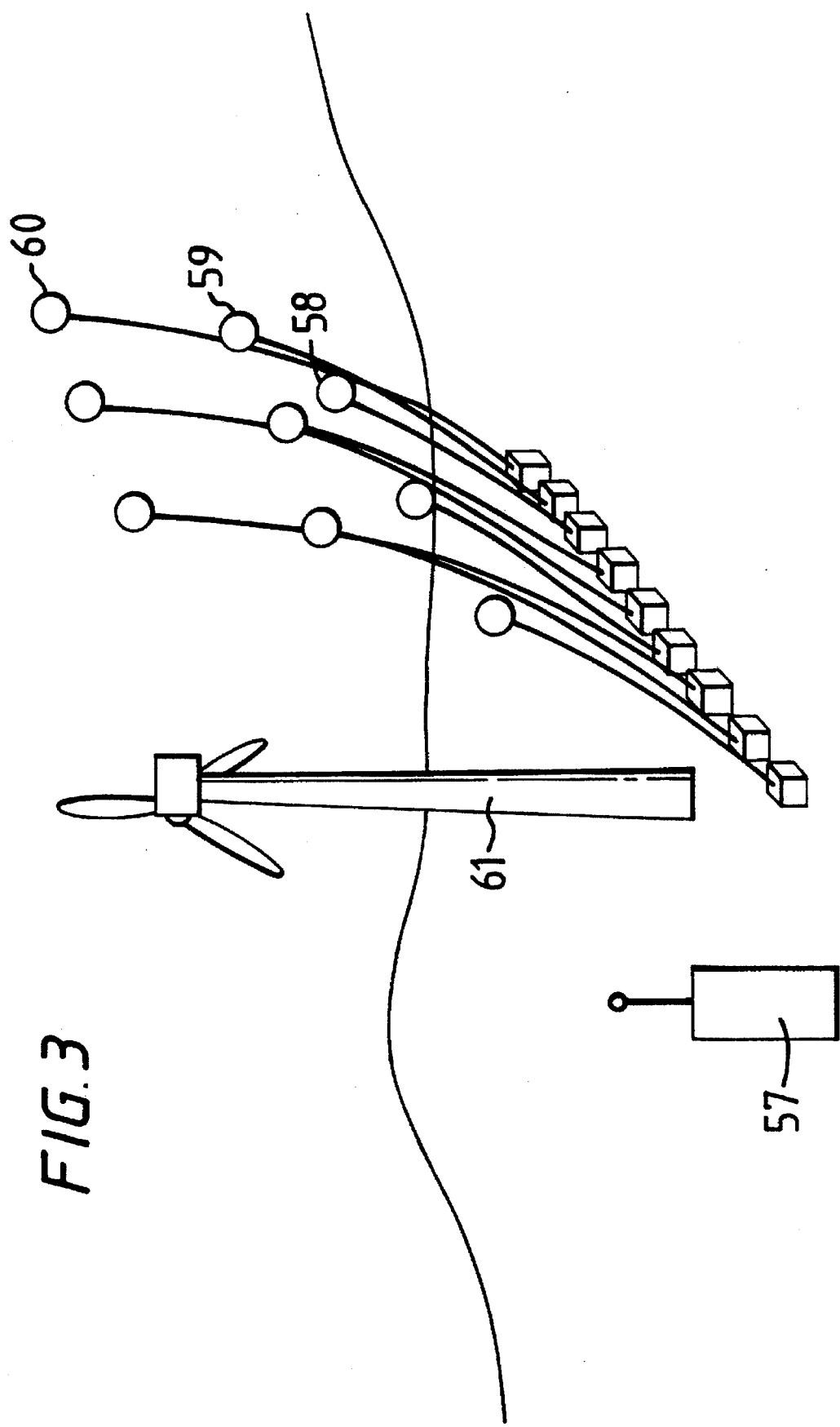
FIG. 3 is a schematic view of a second embodiment of the present invention utilizing the second kind of detector device, the devices being deployed around a wind turbine.

A second preferred embodiment of the present invention is shown in FIG. 3. In this embodiment, three lines of detectors (FIG. 2) are deployed on the leeward side of the wind turbine 61. Each line (58,59,60) of detectors comprises three detectors. Each of the detectors in the first line 58 has its tether 54 set to a length which results in the height of the balloon 55 being in the lowermost region of the height range being investigated. Each of the detectors in the second line 59 has its tether 54 set to a length which results in the balloon 55 of those detectors being disposed at a height approximately in the middle of the height range being investigated. Finally, each of the detectors in the third line 60 has the length of its tether 54 set to a height in the uppermost region of the height range being investigated. The three lines 58,59,60 are arranged to coincide, that is to say that the anchor modules of the detectors of the lines 58,59,60 are disposed along a straight line. The detectors are thereby arranged in a wall configuration, whereby the measurement provided by any one detector is not affected by the presence of the other detectors.

The base station 57 comprises a signal receiving means (not shown) and a signal data recording means (also not shown).

The base station 57 and rovers incorporate an electronic multiplexing system, such that each rover is interrogated at fixed time intervals.

The maximum value of the sample time interval is determined by the minimum turbulence wave length to be detected. For example, commercial wind turbine equipment has a diameter of 10 meter:i, and is unlikely to be effected by turbulence wavelengths of less than a few meters.

If V is the wind speed at which measurements are to be made and L is the minimum desired turbulence wavelength to be measured, then the minimum sampled time interval for each rover station is given by:

$$T = \frac{L}{4V}$$

The minimum measurable turbulence wavelength is also determined by the physical dimensions of the balloon 55. For example, a balloon 55 of diameter 1 meter is unlikely to be effected by turbulence cells of 10 centimeter wavelength or less and wind turbine of 40 meter diameter is unlikely to be effected by a turbulence wavelength of 1 meter or less.

For example, given the extreme requirements of L=2 meters and V 20 meters per second, then all rover stations must be sampled within a time of 25 milliseconds. This is termed the "Half Nyquist" sample interval and represents the largest sampling interval permitted to completely define the wavelength in question. The above described embodiment is arranged to operate in a "Recording Only" mode.

In this mode, raw satellite data received by the antenna 56 of the rovers is transmitted to the base station 57 where it is recorded for future analysis.

Once data representative of the turbulence created by the wind turbine has been recorded, the array can be moved to successively spaced positions behind the wind turbine 61, The data obtained from each of these positions can be collated to build up data representative of the turbulence zone around the wind turbine. This method of utilizing the detectors enables a small number of detectors to be used to provide data representative of wind Characteristics over an area larger than the area that can be covered at any one time by that number of detectors.

Alternatively, the system can be operated in "Real-Time" mode. In the Real-Time mode, the base station 57 additionally comprises the components 7 though to 11 already described in relation to the first embodiment.

On deploying such a system, the positions of the anchors 51 are determined precisely and this information is entered into the computer 7 via the keyboard 10. Additionally, for each anchor 51, the length of deployed umbilical 52 is also determined precisely and made available via the keyboard 10 to the computer 7. Computer programs in the computer then operate on the keyed-in data and the data relayed by the rover components to establish, for each detector, the horizontal/vertical deviation of the balloon 55 relative to the anchor module 51. Subsequently, the computer program compares this deviation with the wind-speed-versus-deviation characteristics for the geometry of the detector to infer instantaneous wind speeds and other turbulence characteristics.

This data may thereafter be used to provide a Real-Time (less than a few milliseconds delay) three-dimensional displays of the response of the detectors. For example, the data may be processed to provide a screen image of the VDU 9 such that the horizontal axis represents the easting coordinate of the detector locations, the vertical axis represents the northern coordinates of the detector locations, the individual screen pixels being coloured according to the values output by the deployed detectors.

As an alternative, the wind speed and direction may be displayed on the screen as arrows or vectors. The blunt end of the arrows are positioned at a fixed location on the screen, corresponding to the coordinates of the detectors, the length of the arrows representing the magnitude of the wind speed, and the direction of the arrows representing the azimuth of the wind.

Figure 4:
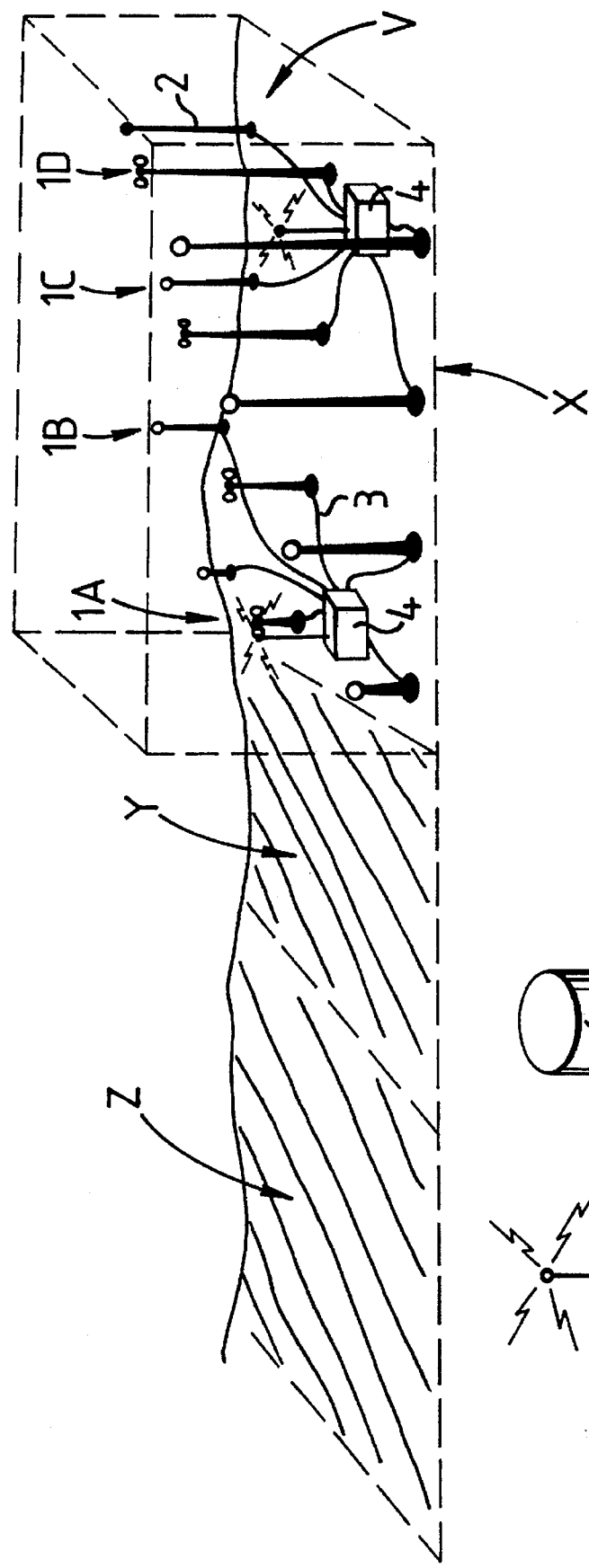
FIG. 4 is a schematic view of a third embodiment of the present invention utilizing the first kind of detector device and being deployed in a preferred configuration within a chosen survey area.

FIG. 4 shows a third embodiment of the present invention. In this embodiment, twelve detectors 2 are positioned in a predetermined regular spatial array over an area of land. Each detector comprises a base from which a support mast extends upwardly, the support mast supporting an anemometer at its uppermost end. Each detector is provided with a means for converting the anemometer reading to an electrical signal.

The twelve detectors are arranged so that their positions form a regular grid over the area of land being investigated comprising four spaced parallel lines of three detectors, where the spacing between the detectors in each line is the same as the spacing between the lines themselves.

Each of the detectors 2 in the first leeward line of detectors 1D has its support mast extended to its full height. Each of the detectors in the adjacent line 1C of the windward side has its support mast extended to three-quarters of its full height. Each of the detectors in the next adjacent line 1B has its support mast raised to one half its full height. Each of the detectors in the windward line 1A has its support mast raised to one quarter of its full height.

The anemometers of the array are arranged into a "ramp" configuration, in which the regular spatial array of detectors is arranged into a series of lines, the height of the detectors in each line being greater than the height of the corresponding detectors in an adjacent line on the leeward side. This configuration has the result that the measurements of the leeward detectors are not affected by the presence of the other detectors on the windward side.

Wires lead from each of the detectors in the two leeward lines 1C, 1D to a local line control unit 4. A second set of wires lead from each of the detectors in the two windward lines 1A, 1B to another local line control unit 4. Both local line control units 4 are provided with radio transmitters and are arranged to transmit signals to a common receiving unit 5. The receiving unit 5 has connections to data storage means 6.

In use, the common control unit 5 is arranged to receive signals from each detector in turn, the signals being indicative of the reading of each of the anemometers. The common receiving unit 5 subsequently relays the signals to the recording means 6. In addition, the predetermined positions of the detectors in the predetermined spatial array are recorded by a person operating the system. Once a set of data indicative of one or more wind characteristics within the volume V lying above the area of land X has been collected, the spatial array can be moved to the area Y and the above process repeated. Similarly, once data from the volume lying above that area has been collected, the array can be moved to the area Z and data collected for that area also.

These three sets of data are then collated to form a single set of data representative of the magnitude of the wind characteristic over the larger area X+Y+Z. It will therefore be seen that a body of data similar to that gathered in the FIG. 1 embodiment may be obtained and that fewer wind detectors are required to achieve this.

Figure 5A:
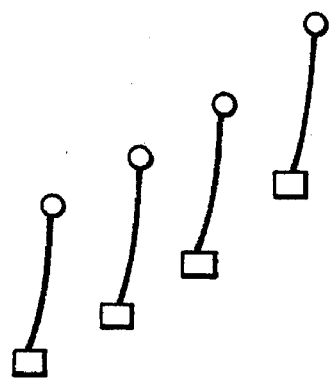
FIGS. 5A, 5B, and 5C are schematic views of preferred configurations of the detector devices which may be employed in different embodiments of the present invention.
Figure 5B:
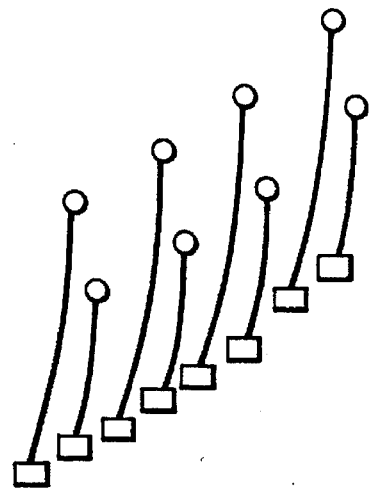
Figure 5C:
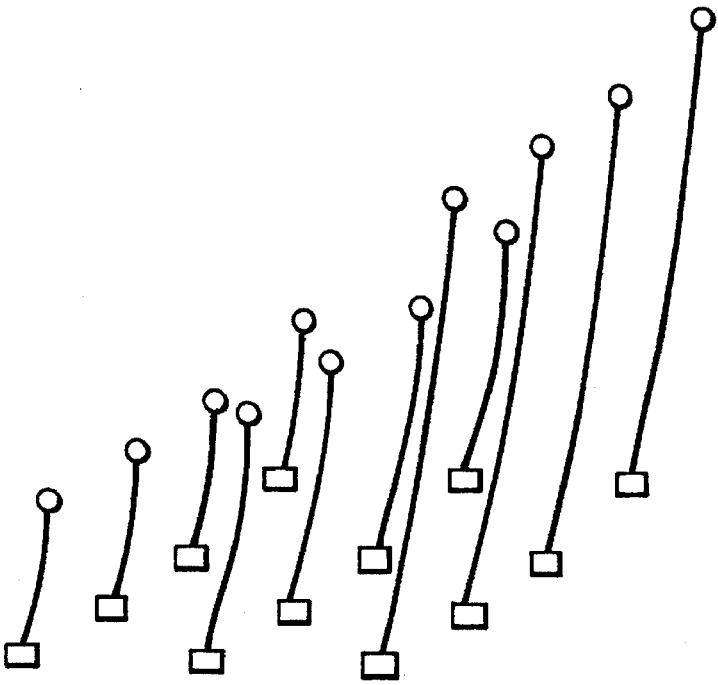

FIGS. 5A to 5C show preferred configurations of detectors to be employed in accordance with the present invention.

In FIG. 5A the bases of two or more detectors (in this example the type of detector shown in FIG. 2) are arranged to lie along a single line, the wind responsive part of each detector (in this example the balloon 55) being positioned at the same height as the others. This configuration of the detectors is known as a "line" configuration. By moving the line of detectors to gather new sets of data and collating that data with sets of data already gathered, it will be seen that it is possible to gather wind characteristic data over a large area with a small number of detectors.

In FIG. 5B, two or more lines of detectors are utilized. The wind responsive part of the detectors in a first line are positioned at a first predetermined height, whereas the wind responsive part 55 of each of a second line of detectors is positioned at a second predetermined height. In addition, the two lines of detectors are arranged to coincide, that is to say the anchor module 51 of every detector is disposed along a single line. This configuration of detectors is known as a "Wall" configuration. This configuration has the advantage that the readings of the detectors are not distorted by the presence of the other detectors.

In FIG. 5C, two or more spaced parallel lines of detectors are provided. The wind responsive part 55 of the detectors in the most windward line is positioned at a first predetermined height above the ground, whereas the windward responsive part 55 of each detector in the line immediately leeward of the most windward line is positioned at a second predetermined height above the ground. The second predetermined height is greater than the first predetermined height, and subsequently windward lines of detectors have their wind responsive part set at successively greater heights above the ground. Such a configuration of detectors is known as a "ramp" configuration. This configuration also has the advantage that the readings of the detectors are not distorted by the presence of the other detectors.

I claim:

1. A system for monitoring wind characteristics within a volume above an area of land, said system comprising:

a plurality of portable wind characteristic measuring means, each of said measuring means comprising means for outputting a data signal which is indicative of the magnitude of at least one wind characteristic and means for affixing said measuring means to the ground; comprising a first set of wind characteristic measuring means deployed in a first line at a first predetermined height;

a second set of wind characteristic measuring means deployed in a second line at a second predetermined height; and an nth set of wind characteristic measuring means deployed in an n line at an nth predetermined height wherein said n lines are spaced parallel to one another, the height above the ground of the wind responsive part of the detectors in a given line being higher than the height above the ground of the wind responsive part of the detectors in all lines to the windward side of that given line;

data signal receiving unit;

communication means for carrying the data signal from each wind characteristic measuring means to said data signal receiving unit; and processing means for processing said data signal and providing processed data, said processed data representing said wind characteristic within said volume.

2. The system of claim 1 further comprising means for displaying said processed data.

3. The system of claim 1 wherein said processing means comprises a means for recording said data.

4. The system of claim 1 wherein all lines coincide.

5. The system of claim 1 wherein characteristic measuring means are airborn.

6. The system of claim 5 wherein said characteristic measuring means comprise gas filled balloons.

7. The system of claim 5 further comprising means for measuring the position of the characteristic measuring means relative to the point of affixation to the ground.

8. A system for monitoring wind characteristics within a volume above an area of land, said system comprising:

a plurality of portable wind characteristic measuring means, each of said measuring means comprising means for outputting a data signal which is indicative of the magnitude of at least one wind characteristic, means for affixing said measuring means to the ground, an airborne wind responsive means supporting an antenna for receiving position indicating electromagnetic signals received from a global positioning system, tethering means for tethering said wind responsive means, an anchoring means for connecting to said tethering means;

data signal receiving unit;

communication means for carrying the data signal from each wind characteristic measuring means to said data signal receiving unit; and processing means for processing said data signal and providing processed data, said processed data representing said wind characteristic within said volume.

9. The system of claim 8 wherein the length of the tethers is adjustable.

10. The system of claim 8 wherein said wind responsive means supports means for receiving position indicating electromagnetic signals.

11. A system for monitoring wind characteristics within a volume above an area of land, said system comprising:

a plurality of portable wind characteristic measuring means, each of said measuring means comprising means for outputting a data signal which is indicative of the magnitude of at least one wind characteristic, means for affixing said measuring means to the ground, an airborne wind responsive means supporting an antenna for receiving position indicating electromagnetic signals;

tethering means, comprising a conductor, for tethering said wind responsive means, anchoring means for connecting to said tethering means;

data signal receiving unit;

communication means for carrying the data signal from each wind characteristic measuring means to said data signal receiving unit; and processing means for processing said data signal and providing processed data, said processed data representing said wind characteristic within said volume;

said tethering means providing a transmission path for carrying the signals received by said antenna to said communication means.

* * * * *